E. I. DODDS.
MEANS FOR AND METHOD OF UTILIZING GAS FROM ELECTRIC STORAGE BATTERIES.
APPLICATION FILED JULY 25, 1917
1,312,311.  Patented Aug. 5, 1919.
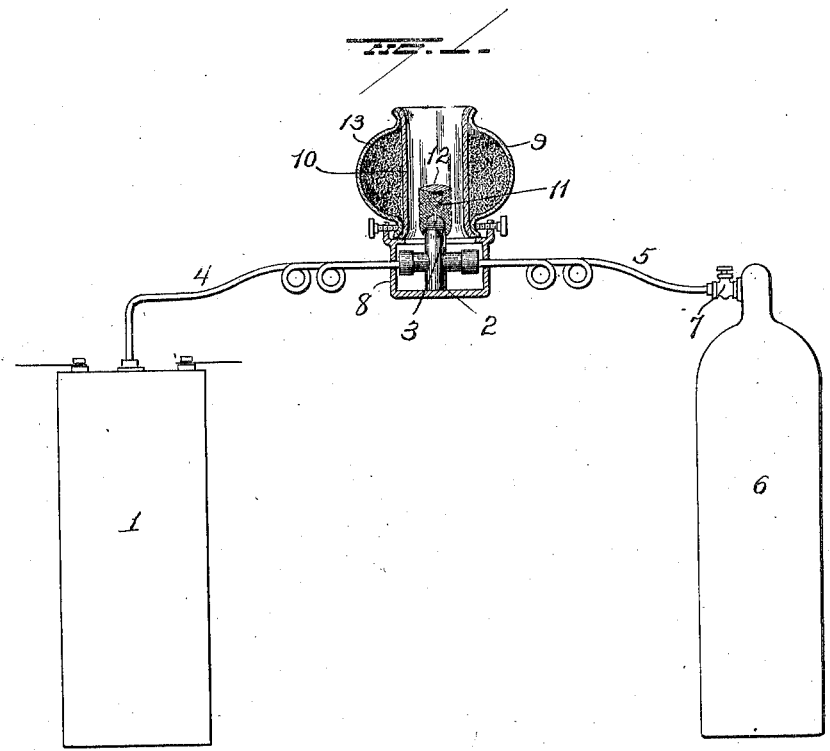
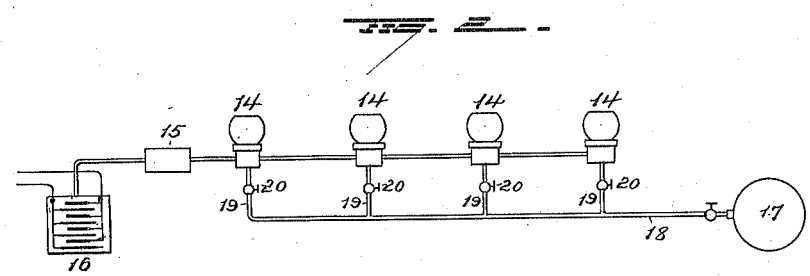

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

MEANS FOR AND METHOD OF UTILIZING GAS FROM ELECTRIC STORAGE BATTERIES.

1,312,311.  Specification of Letters Patent.  Patented Aug. 5, 1919.

Application filed July 25, 1917. Serial No. 182,745.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Means for and Methods of Utilizing Gas from Electric Storage Batteries; and I do hereby declare the following to be a full, clear, and exact description of the invention, such as will enable others skilled in the art to which it appertains to make and use the same.

This invention relates to improvements in means for and the method of utilizing gas from electric storage batteries,—the object of the invention being to collect the gases escaping from the vents of storage batteries and to so treat such gas that it may be employed in an illuminating device.

A further object is to provide simple and efficient means for utilizing gas escaping from storage batteries to activate or energize illuminating means wherein a cold light may be maintained without danger, in the vicinity of the storage batteries or at a distance therefrom.

With these and other objects in view, the invention consists in certain novel features of construction and certain novel steps in the method of utilizing gas from storage batteries, as hereinafter set forth and pointed out in the claims.

In the accompanying drawings; Figure 1 is a view illustrating an embodiment of the invention, and Fig. 2 is a diagrammatical view showing a modified arrangement.

1 represents a storage battery of any approved construction,—such for example as employs lead electrodes and a sulfuric acid electrolyte, and from which oxygen and hydrogen and possibly some sulfur dioxid gases escape. If a storage battery be used employing other elements, the gases escaping therefrom may be differently constituted, but in any case, the present invention contemplates supplying sufficient added oxygen to render said gases freely and safely combustible in a lamp specially constructed for their consumption, which lamp shall afford sufficient light to illuminate the surrounding area for purposes where a mild light may be desired.

In the arrangement shown in Fig. 1, a lamp base in the form of a T-coupling 2 may be provided, and its upright portion made to form a burner 3. One member of the coupling or lamp base 2 is connected, by means of a tube 4 with the gas vent of the storage battery 1. The other arm of the lamp base or T-coupling is connected by a tube 5, with an oxygen tank 6 for supplying sufficient oxygen to cause the gas coming from the battery to be readily combustible,—said pipe 5 being provided with a valve 7 whereby the supply of oxygen may be readily controlled. The lamp base or T-coupling may be inclosed by a suitable casing 8, which supports a globe 9 and a tube 10 disposed in and passing through said globe,—said tube 10 being open at both of its ends. The burner 3 projects into the tube 10 and has mounted thereon, a mantle 11 provided with a disk 12 of catalytic material, such as employed in self-lighting mantles, and which will become incandescent by action of the gas thereon and cause the gas to become ignited.

The interior of the globe 9 will be coated with a material 13 which will absorb light,— viz. be rendered luminous upon exposure to light (or if desired, the tube 10 may be so coated, instead of coating the outer globe 9),—said coating being activated or energized by the light rays emanating from the mantle 11. The coating is of such material that it will maintain its luminosity for a considerable time after the light of the mantle may have become extinguished, so that it is not essential that the mantle shall be kept lighted continuously, being made luminous only at such times as gas may escape from the battery.

The coating 13 may comprise such material as zinc or calcium sulfid and it will preferably also contain an infinitesimal amount of radioactive material, such as a salt of radium.

If desired, a plurality of lamps such as above described may be employed and arranged in series with each other, as illustrated at 14, Fig. 2,—said series of lamps being connected with a storage tank 15 and the latter receiving gas from the storage battery 16. An oxygen tank 17 may be connected with the several lamps by a pipe 18 and short pipes 19 having valves 20.

Having fully described my invention, what

I claim as new and desire to secure by Letters Patent, is:—

1. The herein described method of utilizing gas from an electric battery consisting in conveying gas escaping from an electric battery to a burner, inclosing said burner in a body of light-penetrating material having a coating of phosphorescent material, and burning said gas at the burner to activate said phosphorescent material.

2. The combination of an electric battery, a light-penetrating inclosure carrying phosphorescent material, a burner within said inclosure, a self-lighting mantle on said burner, and means for conveying gas from said electric battery directly to said burner.

3. The combination of an electric battery, a light penetrating inclosure carrying phosphorescent material, a burner within said inclosure, a self-lighting mantle on said burner, a pipe connected with said burner and with said battery to collect gas escaping from the latter, and an oxygen supply communicating with said burner whereby gas from the battery will mix with oxygen and form a freely combustible gas which, when ignited at the burner will cause illumination of the mantle to activate the phosphorescent material of the inclosure and produce a mild light.

In testimony whereof, I have signed this specification in the presence of two subscribing witnesses.

ETHAN I. DODDS.

Witnesses:
CHAS. E. RIORDAN,
G. F. DOWNING.

Copies of this patent may be obtained for five cents each, by addressing the "Commissioner of Patents, Washington, D. C."